| United States Patent [19] | [11] Patent Number: 4,560,480 |
| Lacroix et al. | [45] Date of Patent: Dec. 24, 1985 |

[54] PROCESS FOR CONVERTING SPARINGLY SOLUBLE SALTS OF ANIONIC DYES AND FLUORESCENT BRIGHTENERS INTO MORE SOLUBLE SALTS BY MEANS OF CATION EXCHANGE

[75] Inventors: Roger Lacroix, Village-Neuf, France; Hans-Rudolf Marfurt, Rheinfelden, Switzerland

[73] Assignee: Ciba Geigy Corporation, Ardsley, N.Y.

[21] Appl. No.: 503,485

[22] Filed: Jun. 13, 1983

[30] Foreign Application Priority Data

May 4, 1983 [CH] Switzerland ................ 2425/83

[51] Int. Cl.$^4$ ............................................ B01D 13/00
[52] U.S. Cl. ...................................... 210/638; 210/641
[58] Field of Search ............... 204/151; 210/644, 641, 210/638, 648; 8/438, 440, 657, 659, 682, 664, 665

[56] References Cited

U.S. PATENT DOCUMENTS 3,905,949  9/1975  Perkins et al. .................. 260/143
4,306,946  12/1981  Kim .................................. 204/151 X

FOREIGN PATENT DOCUMENTS 1480712  7/1977  United Kingdom .................... 8/648
2015018  9/1979  United Kingdom .................... 8/440

OTHER PUBLICATIONS

Techniques of Chemistry, vol. 7, "Membranes in Separations", Sun-Tak Hwang, (1975), pp. 166–173.

*Primary Examiner*—Frank Spear
*Attorney, Agent, or Firm*—Edward McC. Roberts; Kevin T. Mansfield; Irving M. Fishman

[57] ABSTRACT

A process is described for converting sparingly soluble salts of anionic dyes and fluorescent brighteners into more soluble salts by means of cation exchange without intermediate isolation of the free dye acid, which comprises carrying out the cation exchange by using Donnan dialysis.

The concentrated dye and brightener solutions obtained in this way are stable and can be directly used for dyeing or printing textile material.

11 Claims, 1 Drawing Figure

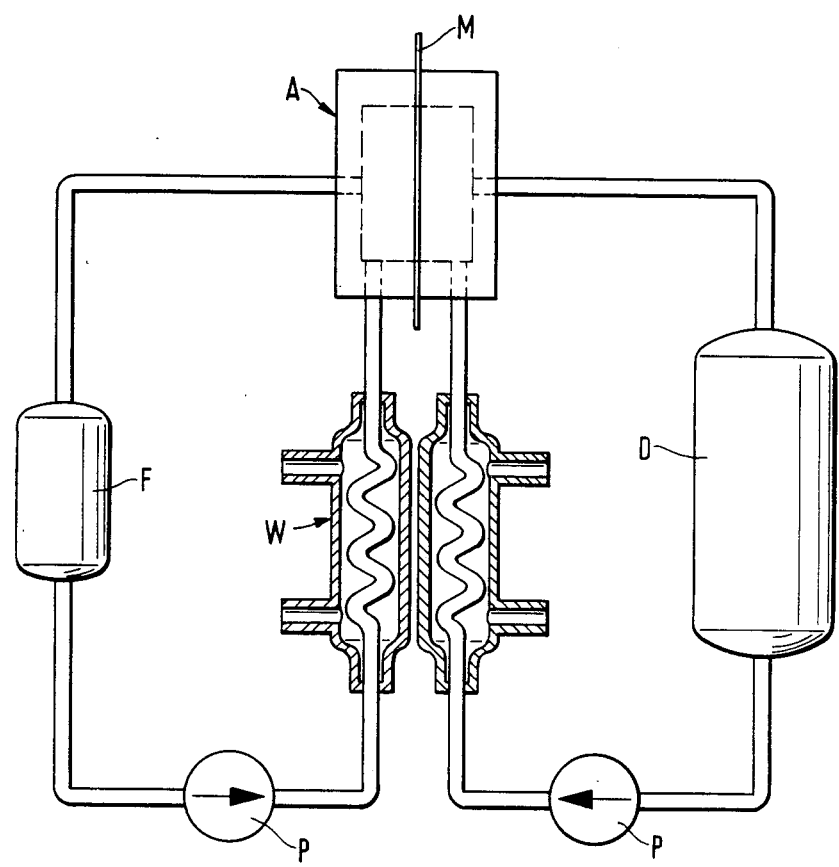

PROCESS FOR CONVERTING SPARINGLY SOLUBLE SALTS OF ANIONIC DYES AND FLUORESCENT BRIGHTENERS INTO MORE SOLUBLE SALTS BY MEANS OF CATION EXCHANGE

SUMMARY OF THE INVENTION

The invention relates to a process for converting sparingly soluble salts of anionic dyes and fluorescent brighteners into more soluble salts, to the concentrated dye or brightener solutions obtained by means of this process, and to their use in preparing solid and liquid dye preparations.

BACKGROUND OF THE INVENTION

The solubility in water or organic solvents of salts of anionic dyes and fluorescent brighteners depends not only on the structure of the dye or brightener, but especially also on the particular salt form, i.e. on the cation. For instance, the sodium salts generally obtained on synthesis are in many cases not readily water-soluble, whereas as lithium salts the same dyes or brighteners are significantly more so (see, for example, German Pat. No. 1,644,308).

To prepare concentrated dye or brightener solutions, which are becoming commercially increasingly important as liquid brands, it is necessary to have dye or brightener salts which are readily water-soluble, since it is only in this way that the solvent content in the preparations can be kept as low as possible. But a high solubility of the dye or brightener is also of advantage in preparing solid preparations, since it makes possible a gentle and energy-saving drying, because highly concentrated starting solutions can be used.

In the past there has been no shortage of attempts to replace the cations of sparingly soluble dye or brightener salts and thus to increase the water-solubility of the salts. Stilbeneazo(xy) dyes, for example, can at present be treated by a whole number of different processes, for example by selective precipitation of sodium ions by means of hexafluorosilicic acid in the presence of alkanolamine (German Offenlegungsschrift 2,451,219) or double resalting involving phase separation (European Patent A 0,053,220). German Offenlegungsschrift 2,805,891 proposes that cation or anion exchange be carried out by means of a membrane-separating method, for example diafiltration. However, this method is only suitable for resaltings, for example of sulfur-containing dyes, if carried out in the presence of cations whose molecular weight is at least equal to or greater than that of the dyes, because otherwise the dyes would also be separated out of the dye solution.

The object is to find a process which is simple to carry out and which places no particular requirements on the molecular weight of the cations to be exchanged.

This object is surprisingly achieved by means of Donnan dialysis (on the theory of the Donnan dialysis, see S. T. Hwang and K. Kammermeyer, Membranes in Separations; Wiley & Sons, New York 1975).

The present invention thus relates to a process for converting sparingly soluble salts of dyes and fluorescent brighteners into more soluble salts by means of cation exchange without intermediate isolation of the free dye acid, the cation exchange being carried out by means of Donnan dialysis.

DETAILED DESCRIPTION OF THE INVENTION

The Donnan dialysis is advantageously carried out in an exchange cell which is divided by a semipermeable membrane into two chambers which each have an inlet opening tangential to the surface of the membrane and a central outlet opening. During the exchange process, not only the dye or brightener solution or suspension but also the dialysis solution are pumped by means of a pump out of a supply vessel through the exchange cell and back to the supply vessel, thereby completing the cycle. In the exchange process, the forced circulation through the exchange cell should preferably be controlled in such a way that the solutions or the suspension flow(s) past the membrane as turbulently as possible.

The energy introduced into the closed system by the pumps, which is measurable as a temperature increase, can, if appropriate, be conducted away by means of heat exchangers.

DESCRIPTION OF THE DRAWING

The FIGURE shows a diagram of the apparatus with which the process of the invention is carried out. The supply vessel F contains the dye or brightener solution or suspension and the supply vessel D contains the dialysis solution. With the pumps P the dye or brightener solution (or suspension) and the dialysis solution, respectively, are pumped through the respective compartments of the exchange cell a past the ion exchange membrane M and back into the supply vessels. The exchange cell has an inlet opening tangential to the surface of the membrane and a central outlet opening. The two streams of liquid are cooled, if necessary, by means of the heat exchangers W.

Donnan dialysis is a membrane process carried out without the application of pressure. The membranes used have the property of being permeable both to the cation of the dye or brightener salt and the cation of the dialysis solution, but of hardly allowing the anion of the dialysis solution to pass through and the dye or brightener anion not at all.

The membranes are cation exchange membranes whose polymer backbone has been modified with polyfunctional compounds containing anionic groups and whose pores have a diameter of 0.1 to 50 $\mu$m. It is preferred to use polysulfone membranes.

The polymer backbone of the membrane consists of natural, cellulosic or synthetic materials which contain as reactive groups, for example, hydroxyl, amino and/or amidoxime groups. Materials of this type can be reacted with suitable reagents which contain anionic groups on the one hand and at least one reactive grouping capable of forming a chemical (covalent) bond on the other.

Examples of polymeric compounds which can be modified in the above manner are the following:
  cellulose acetates, for example those having a low acetyl group content, but also celluloses with a higher degree of acylation, for example secondary rayon acetate, or
  polyvinyl alcohols, or
  polyacrylonitrile and copolymers of acrylonitrile and other ethylenically unsaturated monomers.

A compound used as a reactive reagent which contains one or more anionic groups can be colourless or coloured, such as a sulfo-containing reactive dye. Specific examples of anionic groups are, in addition to the sulfo group, the sulfato group and the carboxyl radical.

However, it is also possible to use membranes whose backbone consists of an inert polymer, for example polyester or polyethylene, which has been coated with an exchange resin. To prepare such membranes, either a finished exchange resin which already contains anionic groups is applied to the polymeric support or the exchange resin is only polymerised when on the support and is then modified by conventional methods, for example by sulfonation.

It is also possible to use membranes which have been modified not only with cationic groups but also with anionic groups, provided there are more anionic groups than cationic groups. Examples of cationic groups are the ammonium, phosphonium and sulfonium groups.

At the start of dialysis, membranes of this type give flows of up to more than 60 mols, based on 1 $m^2$ of membrane area and 24 hours of operation.

The dialysis of dyes and brighteners in the form of the sodium salt using, for example, a 1M lithium chloride solution as dialysis solution leads to almost complete ion exchange. For instance, the mean sodium ion concentration after an operating period of 3 to 4 days, depending on the concentration of the dye solution and the size of the membrane area, is less than 1 g per liter.

Donnan dialysis can exchange, for example, the cations of the following anionic, mainly sulfo-containing dyes: nitro, amino-ketone, ketone-imine, methine, nitrodiphenylamine, quinoline, aminonaphthoquinone or coumarin dyes, in particular anthraquinone and azo dyes, such as monoazo and disazo dyes or 1:1 and 1:2 metal complex dyes, and also stilbeneazo(xy) dyes. It is also possible to use such dyes of said classes as contain one or more fibre-reactive radicals.

The dyes are usually in the form of the sodium salt or the potassium or ammonium salt. If the dye is used in the form of a crude dye, it is advantageous to desalt this crude dye before carrying out the dialysis. This desalting is most simply accomplished by means of a membrane-separating method, for example hyperfiltration.

Chief candidates for use as dialysis solution are aqueous solutions of lithium salts, for example lithium halides, in particular lithium chloride. But the dialysis solution need not be a lithium salt solution, since ammonium salt solutions and alkanolammonium salt solutions are also suitable, and it has been found that stilbeneneazo(xy) dyes, for example, are much more water-soluble when in the form of an alkanolammonium salt, i.e. in the form of a di- or triethanolammonium salt, than in the form of the sodium salt.

In some cases the solubility of a dye or fluorescent brightener is considerably increased by conversion into another salt form. For instance, the solubility in water of the sodium salts of sulfo-containing azo dyes is doubled to tripled on conversion into the corresponding lithium salts.

The concentration of the dye or brightener solution or suspension subjected to ion exchange is advantageously 10 to 500 g/liter, preferably 10 to 300 g/liter. The dialysis solution is generally used in a concentration of 0.5 to 3M, preferably about 1M.

The process is always carried out with an excess of dialysis solution. To achieve, within short periods, the highest possible degree of ion exchange, the dialysis solution is replaced by a fresh solution every 24 hours of operation.

The dye or brightener solution obtained on carrying out the Donnan dialysis can be concentrated by hyperfiltration and can be converted by drying into a solid dye preparation, if desired after the addition of additives such as binders, dustproofing agents, dispersants and/or extenders. By virtue of the fact that the dye concentration has been increased, the drying consumes less energy. Conventional drying methods are used, in particular spray-drying.

The concentrated dye or brightener solution can, however, also be directly processed into a stable liquid formulation. In this case, if desired after the addition of additives customary for liquid formulations, such as textile assistants, foam-inhibiting agents, anti-freezes, humectants, dispersants and/or antimicrobic agents, the dye or brightener solution need only be adjusted to the desired final dye content by dilution and/or by means of extenders.

The dye or brightener preparations are used for preparing dyebaths/brightener baths, padding liquors or print pastes, which are especially suitable for dyeing/brightening or printing textile materials made of natural or synthetic fibres and for dyeing paper.

The following examples serve to illustrate the invention. The exchange rate for the sodium ions (flux rate) is given in mol per $m^2$ of membrane area and day [mol/$m^2$.day].

GENERAL PROCEDURE

In each case, 0.5 liter of dye solution or suspension and 2 liters of a 1M lithium chloride solution are used as starting materials, but the lithium chloride solution has to be replaced by a fresh solution every 24 hours of operation. The two streams of liquid are pumped past the cation exchange membrane in the dialysis cell, and the progress of the ion exchange is monitored by periodic sampling and determination of the sodium ion concentration. The membrane used is a polysulfone membrane having an area of 38 $cm^2$. In every example, the dye of the formula given is a crude dye which has been desalted by means of hyperfiltration.

EXAMPLE 1

The dye of the formula

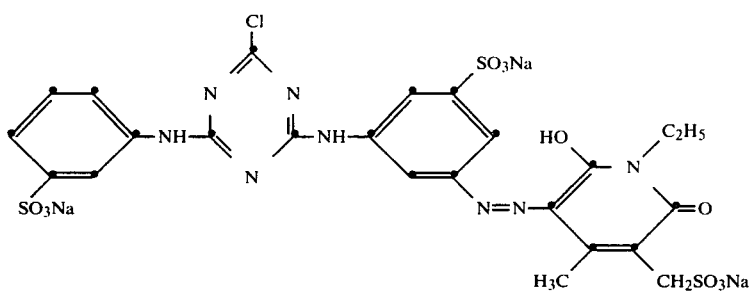

is in a 22% by weight aqueous solution at the start of dialysis. After 72 hours of dialysis, about 87% of the sodium ions have been replaced by lithium ions. As a result, the solubility of the dye has increased from 180 g/liter to 350 g/liter.

| Time [hour] | Na content of the dye solution [g/liter] | Flux rate [mol/m$^2$ · day] |
|---|---|---|
| 0 | 19.3 | |
| 24 | | 62.5 |
| 48 | | 46.6 |
| 72 | 2.9 | 30.3 |
| 96 | 0.6* | |

*determined by interpolation.

EXAMPLE 2

The 1:2 metal complex dye of the formula

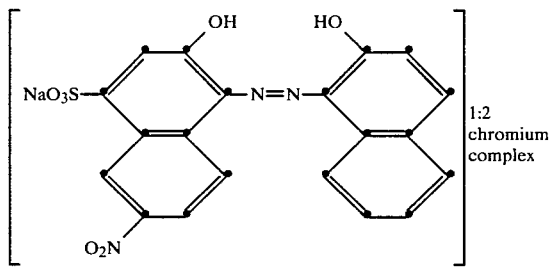

is in the form of an approximately 10% by weight solution (colloidal solution) when subjected to the Donnan dialysis. After 96 hours of operation, 87% of the sodium ions have been replaced by lithium ions. The solubility of the dye in water is now 160 g/liter. As a sodium salt the dye is only soluble to 80 g/liter. In the course of dialysis the dye solution is concentrated to a final volume of 400 ml.

| Time [hour] | Na content of the dye solution [g/liter] | Flux rate [mol/m$^2$ · day] |
|---|---|---|
| 0 | 4.1 | |
| 24 | | 19.5 |
| 48 | | 4.6 |
| 72 | | 3.1 |
| 96 | 0.67 | 2.2 |

EXAMPLE 3

A 3.9% by weight suspension of a mixture of yellow stilbeneazo(xy) dyes obtained by self-condensation of 4-nitrotoluene-2-sulfonic acid in the presence of sodium hydroxide solution, is subjected to Donnan dialysis. The water-solubility of the stilbeneazo(xy) dyes in the form of the sodium salt is very low, being about 1 g/100 ml. After 3 days of dialysis the dye mixture is almost completely in the lithium salt form, and the solubility is now about 13 g/100 ml. In the course of dialysis the ion exchange is accompanied by a concentrating; the final volume of the dye solution is 390 ml.

| Time [hour] | Na content of the dye solution [g/liter] | Flux rate [mol/m$^2$ · day] |
|---|---|---|
| 0 | 5.4 | |
| 24 | · | 39.5 |
| 48 | | 3.95 |
| 72 | 0.04 | 0.5 |

EXAMPLE 4

The reactive dyestuffs of the following formulas are subjected to Donnan dialysis (employing each time 500 ml of a 20 to 25% by weight solution or suspension of dyestuff) thus converting the sodium salt form of the dye into the corresponding lithium salt with an exchange rate of between 92 and 97%. The resulting data are listed in the table following.

Dyestuff (I)

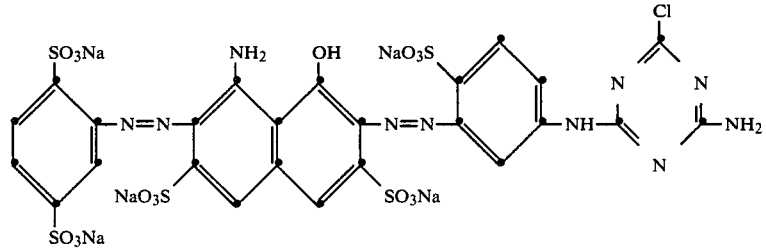

Dyestuff (II)

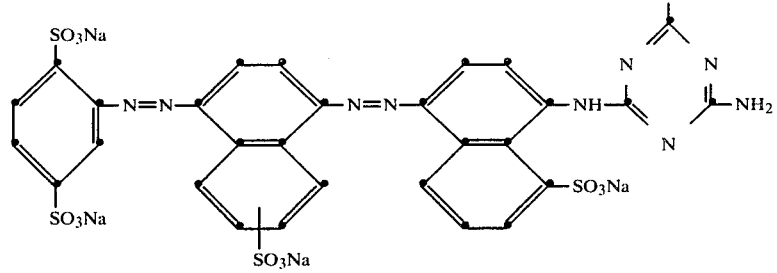

Dyestuff (III)

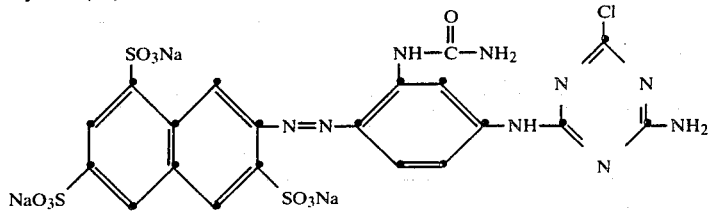

Dyestuff (IV)

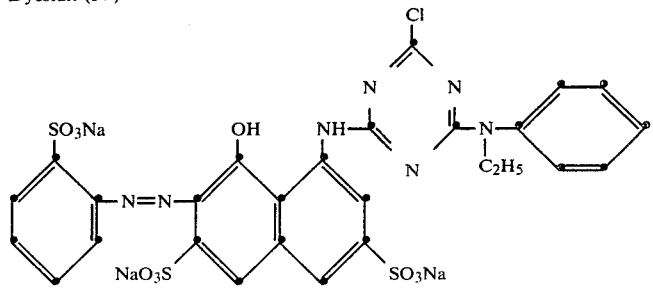

| Dye-stuff | Time [h] | Na content of the dye solution [g/litre] | Flux rate [mol/m²·day] | Donnan dialysis [g/litre] Solubility of the dyestuff | |
|---|---|---|---|---|---|
| | | | | before | after |
| I | 0 | 21,7 | | | |
| | 24 | 12,2 | 77,2 | | |
| | 120 | 1,1 | 7,0 | ca. 100 | 250 |
| II | 0 | 22,0 | | | |
| | 24 | 12,5 | 78,0 | | |
| | 120 | 1,5 | 9,0 | 240 | 360 |
| III | 0 | 16,0 | | | |
| | 24 | 8,9 | 59,8 | | |
| | 120 | 0,5 | 3,6 | ca. 120 | 280 |
| IV | 0 | 24,6 | | | |
| | 24 | 15,2 | 74,9 | | |
| | 120 | 1,9 | 11,4 | 230 | 290 |

What is claimed is:

1. A process for converting sparingly soluble salts of anionic dyes and brighteners into more soluble salts by means of cation exchange without intermediate isolation of the free dye acid, which comprises carrying out the cation exchange by using Donnan dialysis.

2. The process according to claim 1, wherein the sparingly soluble salts used are selected from the group consisting of sodium, potassium, and ammonium salts of said dyes or brighteners.

3. The process according to claim 1, wherein the Donnan dialysis is carried out in an exchange cell in which a dye or brightener solution or suspension and a dialysis solution are separated from each other by a semipermeable membrane, and the two solutions, or the suspension and solution are passed along the surface of the membrane.

4. The process according to claim 3, wherein the semipermeable membrane used is a cation exchange membrane whose polymer backbone has been modified with polyfunctional compounds containing ionic groups and whose pores have a diameter of 0.1 to 50 μm.

5. The process according to claim 3, wherein the membrane used is a polysulfone membrane.

6. The process according to claim 3, wherein the concentration of the dye or brightener solution or suspension is 10 to 500 g/liter and the concentration of the dialysis solution is 0.5 to 3M.

7. The process according to claim 1, wherein the dialysis solution used is a lithium salt solution.

8. The process of claim 7 wherein said lithium salt solution is a lithium chloride solution.

9. The process according to claim 1, wherein the dye or brightener solution is concentrated after the Donnan dialysis by means of hyperfiltration.

10. A concentrated dye or brightener solution obtained by the process of claim 1.

11. A method of preparing a solid or liquid dye or brightener preparation which comprises mixing a concentrate dye or brightener solution of claim 10 with conventional further additives.

* * * * *